United States Patent
Hwang

(10) Patent No.: US 8,157,100 B2
(45) Date of Patent: Apr. 17, 2012

(54) STRUCTURE FOR FIXING SCREEN BARS OF SCREENING APPARATUS FOR WASTEWATER TREATMENT

(75) Inventor: Doo Yun Hwang, Seoul (KR)

(73) Assignee: Blue Whale Screen Co., Ltd., Gyeonggi-do (KR)

( * ) Notice: Subject to any disclaimer, the term of this patent is extended or adjusted under 35 U.S.C. 154(b) by 589 days.

(21) Appl. No.: 12/214,388

(22) Filed: Jun. 17, 2008

(65) Prior Publication Data
US 2008/0314805 A1  Dec. 25, 2008

(30) Foreign Application Priority Data
Jun. 21, 2007  (KR) .................. 10-2007-0061163

(51) Int. Cl.
*B07B 1/49* (2006.01)

(52) U.S. Cl. ........................ 209/395; 209/405

(58) Field of Classification Search .......... 209/379, 209/387, 392, 393, 395, 405, 930
See application file for complete search history.

(56) References Cited

U.S. PATENT DOCUMENTS
5,769,240 A * 6/1998 Middour et al. .............. 209/314

FOREIGN PATENT DOCUMENTS
| JP | 57-164123 | 10/1982 |
| KR | 0104628 | 6/1996 |
| KR | 0129369 | 12/1998 |

\* cited by examiner

*Primary Examiner* — Joseh C Rodriguez
*Assistant Examiner* — Kalyanavenkateshware Kumar
(74) *Attorney, Agent, or Firm* — Abelman, Frayne & Schwab

(57) ABSTRACT

Disclosed herein is a structure for fixing screen bars of a screening apparatus, which is installed in a wastewater treatment plant to remove impurities contained in wastewater and includes a screen panel formed by arranging the screen bars parallel to each other to have gaps ranging from 1 mm to 10 mm therebetween. The screen bar fixing structure of the present invention is constructed such that screen bars, which are thin and long shapes, can maintain the straightness and gaps therebetween constant even though the screen bars are not welded to support bars provided on the rear surfaces of the screen bars, thus solving the problem in which impurities such as hairs, which are relatively long, are wound around the support bars, with the result that rakes undesirably flip or are damaged, or the gaps between the screen bars become clogged.

7 Claims, 6 Drawing Sheets

STRUCTURE FOR FIXING SCREEN BARS OF SCREENING APPARATUS FOR WASTEWATER TREATMENT

CROSS REFERENCE TO RELATED APPLICATION

This application claims the benefit of Korean Patent Application No. 10-2007-0061163, filed Jun. 21, 2007, entitled "Screen bar fixing structure of screening apparatus for treating wastewater", which is hereby incorporated by reference in its entirety into this application.

BACKGROUND OF THE INVENTION

1. Field of the Invention

The present invention relates generally to structures for fixing screen bars of screening apparatuses which are installed in wastewater treatment plants to remove impurities from wastewater and, more particularly, to a structure for fixing screen bars of a screening apparatus for wastewater treatment in which the screen bars are provided at positions spaced apart from each other at predetermined intervals to have gaps ranging from 1 mm to 10 mm therebetween, and which is constructed such that, in a process of removing fine suspended solids from water, impurities such as hairs, which are relatively long, are prevented from being wound around support bars, which are perpendicularly provided under the screen bars to support the screen bars, thus preventing rakes from being undesirably flip or damaged by the wound impurities, and preventing gaps between the screen bars from being clogged with the impurities, thereby preventing the overflow of wastewater.

2. Description of the Related Art

As well known to those skilled in the art, screening apparatuses for wastewater treatment are classified into the coarse screening apparatus which screen bars are arranged to have gaps ranging from 50 mm to 100 mm to remove relatively large impurities for protecting machines disposed behind the screen, the fine screening apparatus which screen bars are arranged to have gaps ranging from 20 mm to 40 mm to remove smaller impurities, and the superfine screening apparatus which screen bars are arranged to have gaps ranging from 1 mm to 10 mm to remove fine suspended solids, which are the majority of suspended solids contained in wastewater, installed behind the coarse screening apparatus or behind the fine screening apparatus.

Such the screening apparatuses are consisted of a screen panel and some rake units. The screen panel is formed by arranging steel bars such as flat bars having rectangular cross-sections, round bars, or wedge bars having inverted triangular cross-sections, parallel to each other at predetermined intervals, and is installed in a wastewater flowing channel or a water tank and is oriented in a vertical direction or at a slight incline with respect to the vertical direction. The rake unit rakes and pulls the impurities up, which are caught by the screen bars but do not pass through gaps between the screen bars while wastewater flows through the screening apparatus, towards the upper end of the screen panel, and exhausts the impurities outside the screening apparatus.

In the case of the coarse screening apparatus or the fine screening apparatus, flat bars, each of which has a cross-section of 9 mm in thickness and 75 mm in width, are placed upright and are arranged parallel to each other at intervals ranging from 20 mm to 100 mm to fix the screen bars for filtering out impurities larger than the gaps while wastewater flows through the screening apparatus. Thereafter, holes are formed in the flat bars at positions that are spaced apart from each other at intervals ranging from 40 cm to 80 cm in the vertical direction. Subsequently, in a state in which spacing pipes, each of which has a length corresponding to the width of the gap, ranging from 20 mm to 100 mm are fitted between the screen bars. And round bars, each of which has a length corresponding to the entire width of the screen panel and has an external thread on the each end thereof, are inserted into the respective holes which are formed in the flat bars.

And in the case where round bars or wedge bars are used as screen bars, support bars which are made of flat bars or round bars, and have a length corresponding to the width of the screen panel are arranged at positions spaced apart from each other at intervals ranging from 40 cm to 50 cm. Thereafter, the round screen bars or wedge screen bars are placed on the support bars at intervals ranging from 20 mm to 40 mm parallel to each other such that are perpendicular to the support bars. And then, the round bars or wedge bars are fixed to the support bars by welding, thus forming the screen panel.

However, in the case of the superfine screen, having gaps ranging from 1 mm to 10 mm, the screen bars are easily bent as round bars or wedge bars used as the screen bars have diameters or cross-sectional widths ranging from 2 mm to 4 mm, which is very thin. Thus, to maintain the straightness of the screen bars and gaps between the screen bars constant, the intervals between support bars, which are arranged perpendicular to the screen bars and are welded to the rear surfaces of the screen bars, must be very short, typically ranging from 5 cm to 15 cm.

Furthermore, welding beads are formed on the surfaces of the support bars by the welding between the support bars and the screen bars, and the surfaces of the support bars are rough. Therefore, stringy impurities, such as hairs, strings, etc., contained in wastewater, which flows through the gaps between the screen bars, are easily entangled on at least several hundreds or thousands of welding portions between the support bars and the screen bars, and the amount of entangled impurities gradually increases. As a result, there is a problem in that the teeth of each rake, which are inserted into the respective gaps between the screen bars and move upwards along the screen bars, are interfered by the entangled impurities and are thus bent or damaged.

In an effort to overcome the above-mentioned problem experienced with the conventional technique, cushion hinge mounted rake devices using the tension of springs to overcome the problem of damage of the rakes were proposed in Korean Utility Model Registration No. 0104628 and No. 0129369. However, in the case where the amount of impurities entangled in the screen bars is gradually increased, and thus the cushion hinge mounted rakes repeatedly flip while moving along the screen bars, the springs for the cushion hinge mounted rakes may be broken.

Furthermore, because the drag force of the rakes is notably weakened by the elastic rotation of the springs, although the rakes repeatedly and continuously move along the screen bars and rake the gaps between the screen bars, impurities, which are entangled in the support bars, may be incompletely removed. Moreover, in this case, the amount of impurities entangled in the support bars is gradually increased, and gaps between the screen bars adjacent to the support bars are slowly clogged with impurities entwined around the support bars. Ultimately, most of the gaps are clogged with impurities, thus inducing the overflow of wastewater.

SUMMARY OF THE INVENTION

Accordingly, the present invention has been made keeping in mind the above problems occurring in the prior art, and an object of the present invention is to provide a structure for fixing screen bars of a screening apparatus for wastewater treatment which is constructed such that screen bars which are thin and have long shapes, can maintain the straightness and gaps therebetween constant although the screen bars are not welded to support bars provided on the rear surfaces of the screen bars, thus solving the problem in which impurities such as hairs, which are relatively long, are wound around the support bars, with the result that rakes undesirably flip or the gaps between the screen bars clog and the overflow of wastewater is thus induced.

Another object of the present invention is to improve the structure for fixing the screen bars which are arranged to have gaps ranging from 1 mm to 10 mm therebetween, to the screening apparatus, such that impurities can be prevented from being wound around or entangled in the support bars, which perpendicularly support the screen bars, in a wastewater treatment process.

A further object of the present invention is to provide a structure for fixing screen bars of a screening apparatus for wastewater treatment which is constructed such that the support bars, which perpendicularly support the screen bars to prevent the screen bars from sagging, do not interfere the linear travel track of teeth of rakes which rake the gaps between the screen bars, thus preventing the rakes from flipping while traveling or from being broken.

Yet another object of the present invention is to improve the structure for fixing the screen bars, which are arranged to have gaps ranging from 1 mm to 10 mm therebetween, to the screening apparatus, such that the number of support bars, which perpendicularly support the screen bars to prevent the screen bars from sagging, can be minimized, thus making the manufacture of the screening apparatus easy, and reducing the production costs thereof.

In order to accomplish the above object, the present invention provides a structure for fixing screen bars of a screening apparatus for wastewater treatment, the screening apparatus being installed in a wastewater treatment plant to remove impurities contained in wastewater, the screening apparatus comprising a screen panel formed by arranging the screen bars parallel to each other to have gaps ranging from 1 mm to 10 mm therebetween, and rakes for moving along the screen panel using driving means to rake the impurities caught by the screen panel, wherein lower ends of the screen bars are fastened to a rear part of a lower end of the screening apparatus, upper ends of the screen bars are bent towards rear surfaces of the screen bars and fastened to a rear part of an upper end of the screening apparatus such that the upper ends of the screen bars are prevented from interfering with the linear travel track of the rakes, and medial portions of the screen bars are supported by some support bars, oriented in a direction perpendicular to the screen bars, to prevent the medial portions of the screen bars from sagging.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
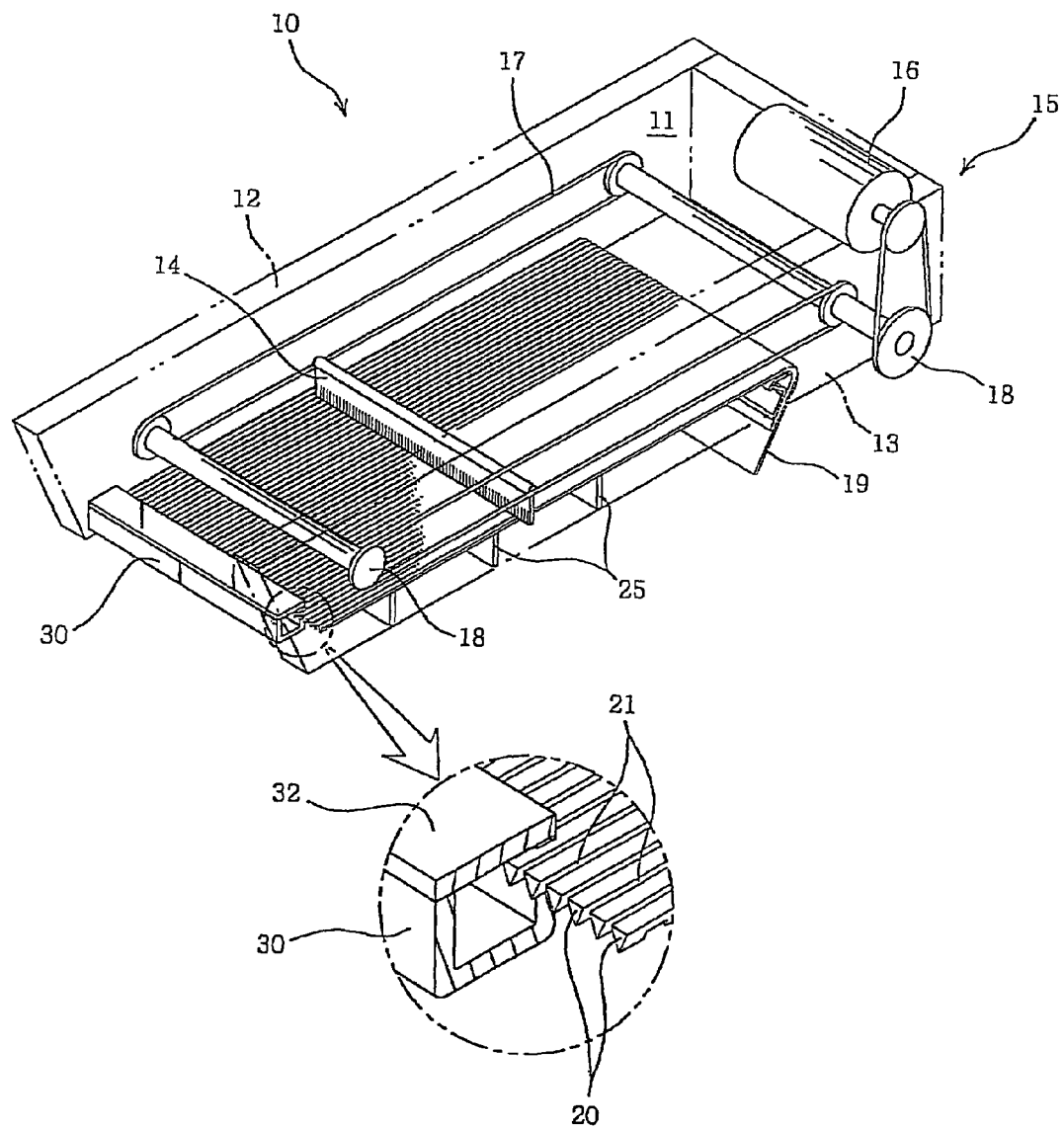
FIG. 1 is a perspective view showing a screening apparatus for wastewater treatment, according to a first embodiment of the present invention.

FIG. 1 is a perspective view showing a screening apparatus for wastewater treatment, according to a first embodiment of the present invention, in which a rake is provided so as to be movable using a driving means in an impurity removal space defined between a pair of opposite side-frames of the screening apparatus, and screen bars are arranged parallel to each other at positions spaced apart from each other at regular intervals at the lower position in the impurity removal space to form a screen panel for removing fine suspended solids from wastewater.

Figure 2:
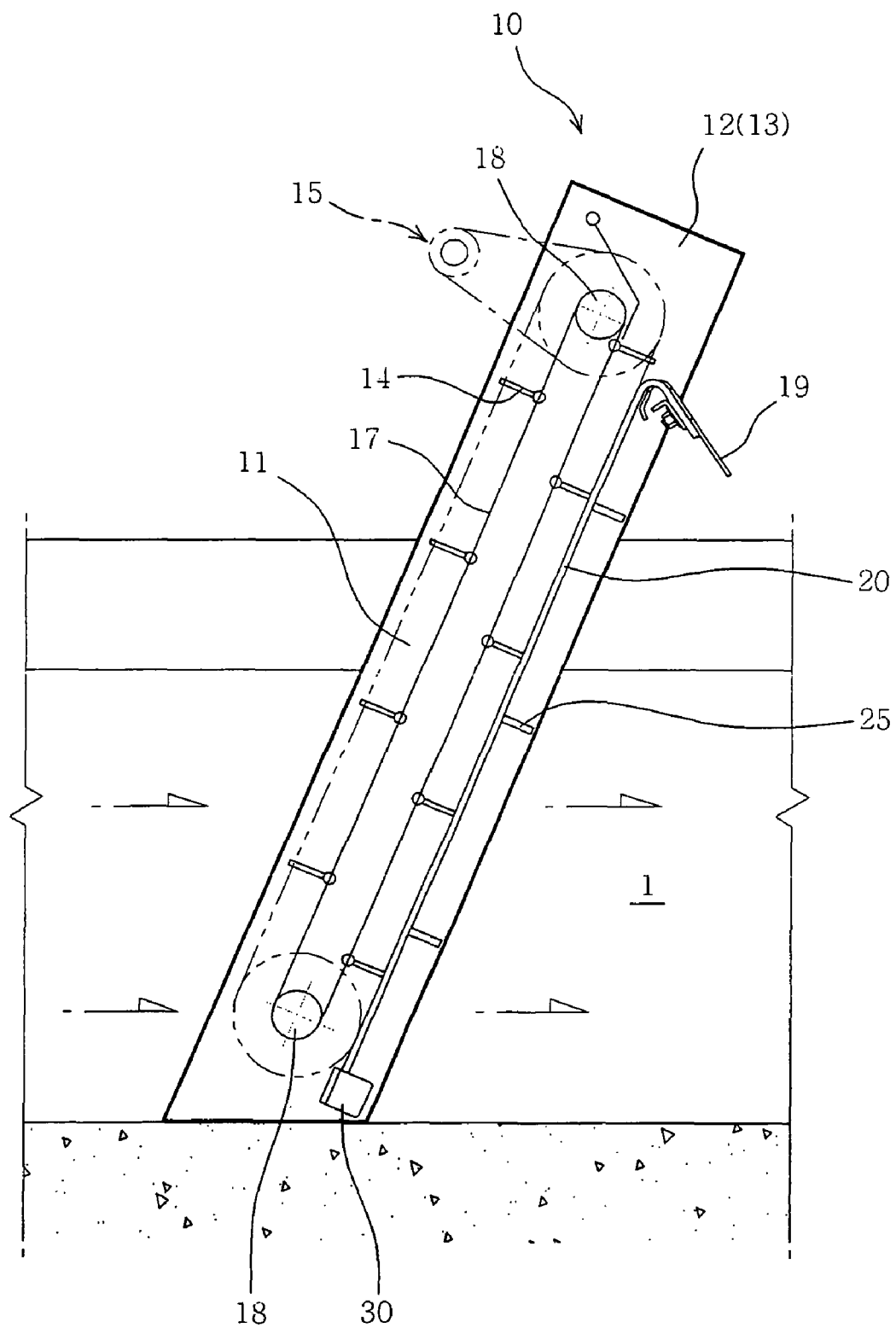
FIG. 2 is a side view showing the installation of the screening apparatus in a channel according to the first embodiment of the present invention.

FIG. 2 is a side view illustrating the installation of the screening apparatus in a channel according to the present invention. In detail, FIG. 2 shows that the screening apparatus, in which the screen bars are arranged parallel to each other at regular intervals and are fixed to the lower end of the screening apparatus to form the screen panel according to the first embodiment of the present invention, is installed in the channel for wastewater treatment at an incline.

Figure 3:
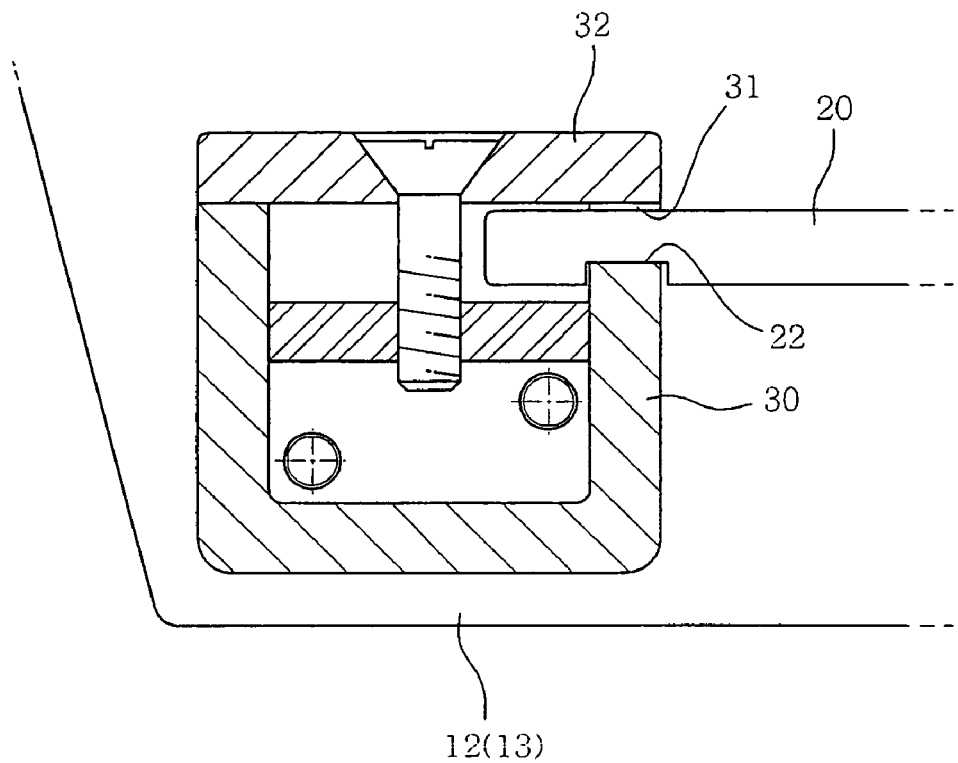
FIGS. 3 through 4 are partial enlarged views showing a structure for fixing the lower ends of screen bars according to the first embodiment of the present invention.
Figure 4:
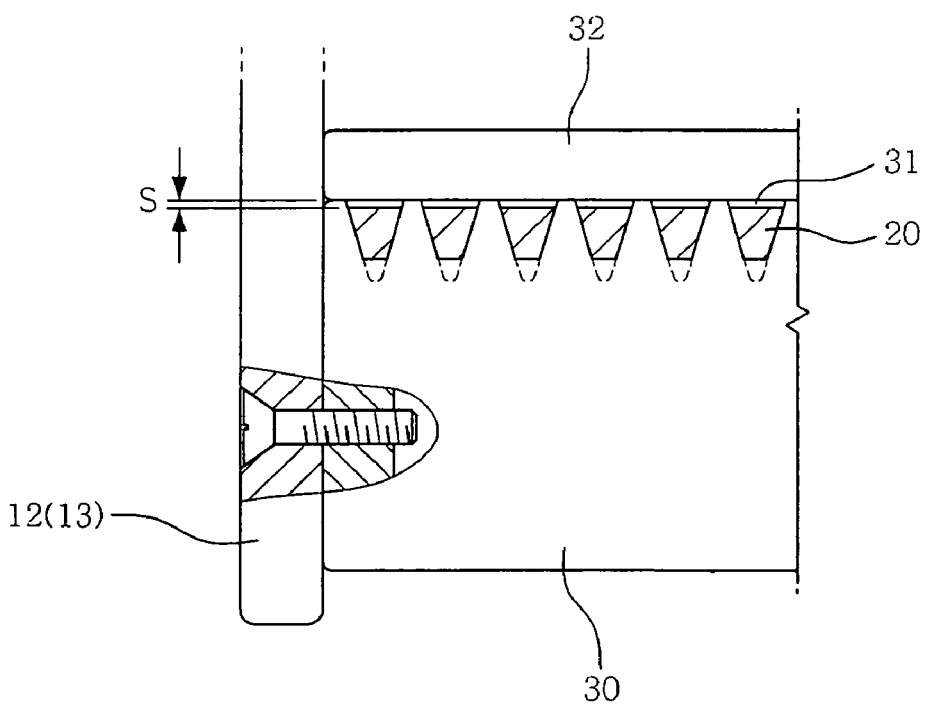

FIGS. 3 through 4 are partial enlarged views showing a structure for fixing the lower ends of the screen bars, in which the lower ends of the screen bars are fitted into and fixed to respective fastening holes, which are formed in a lower spacer, using notches formed in the lower ends of the screen bars.

Figure 5:
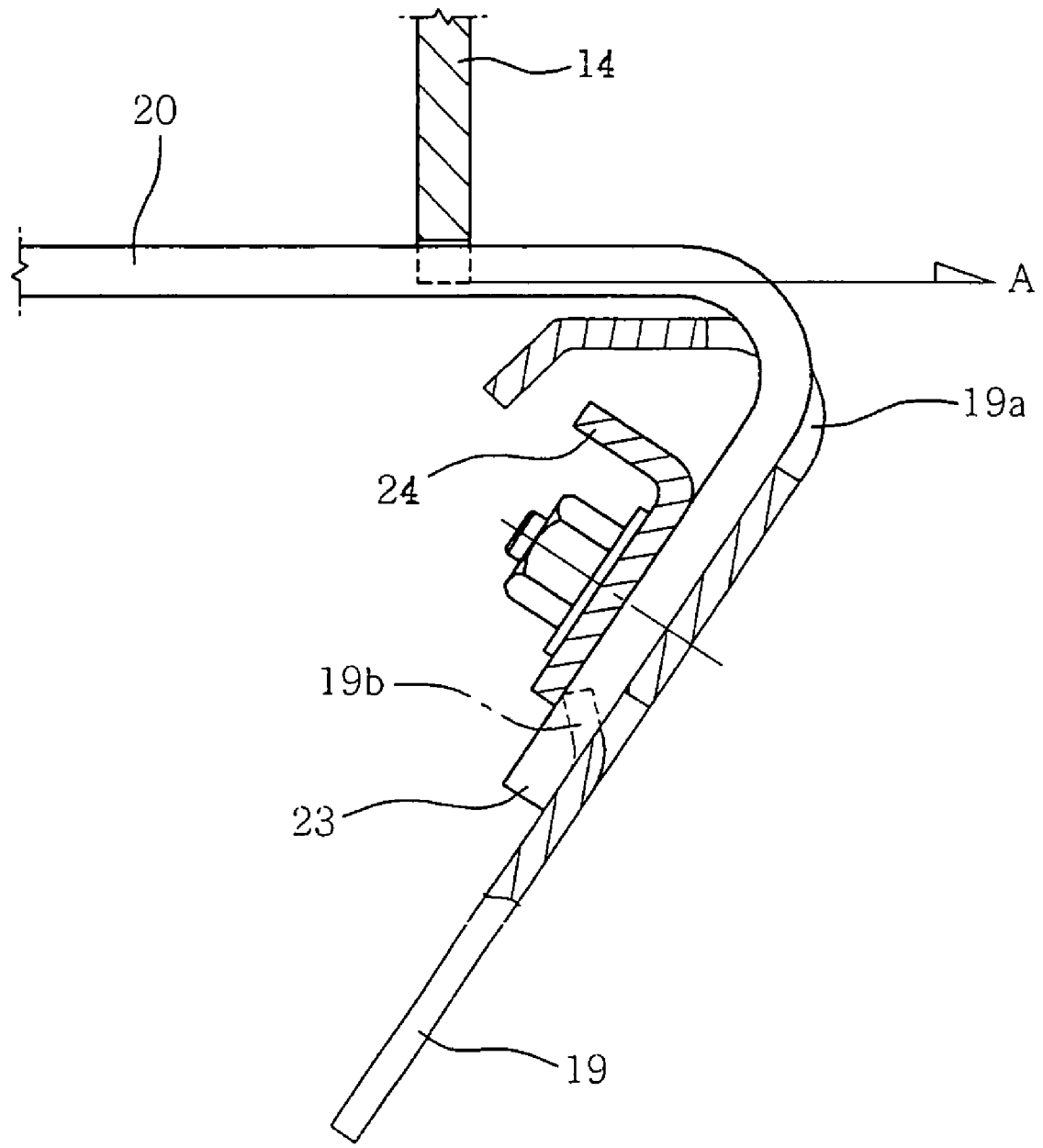
FIG. 5 is a partial enlarged view showing a structure for fixing the upper ends of the screen bars according to the first embodiment of present invention.

FIG. 5 is a partial enlarged view showing a structure for fixing the upper ends of the screen bars according to the first embodiment of present invention. In detail, FIG. 5 shows that fastening parts of the upper ends of the screen bars are in close contact with and are bolted to an impurity removal guide for removing fine suspended solids, which are held and moved upwards by the rake.

Figure 6:
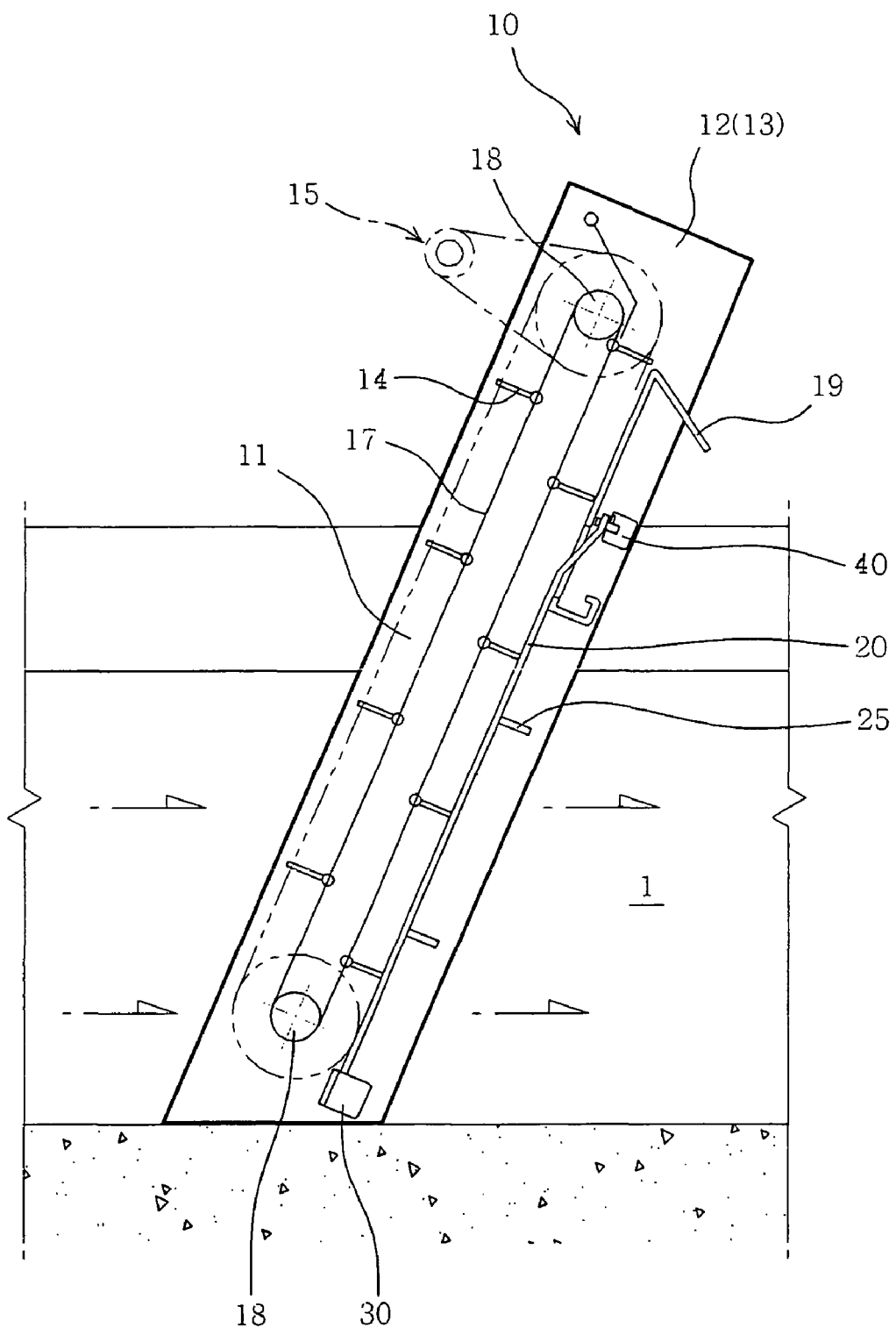
FIG. 6 is a side view illustrating the installation of a screening apparatus in a channel according to a second embodiment of the present invention.

FIG. 6 is a side view illustrating the installation of a screening apparatus in a channel according to a second embodiment of the present invention. In detail, FIG. 6 shows that the screening apparatus, in which screen bars are arranged parallel to each other at regular intervals and are fixed to the lower end of the screening apparatus to form the screen panel according to the second embodiment of the present invention, is installed in the channel for wastewater treatment at an incline.

Figure 7:
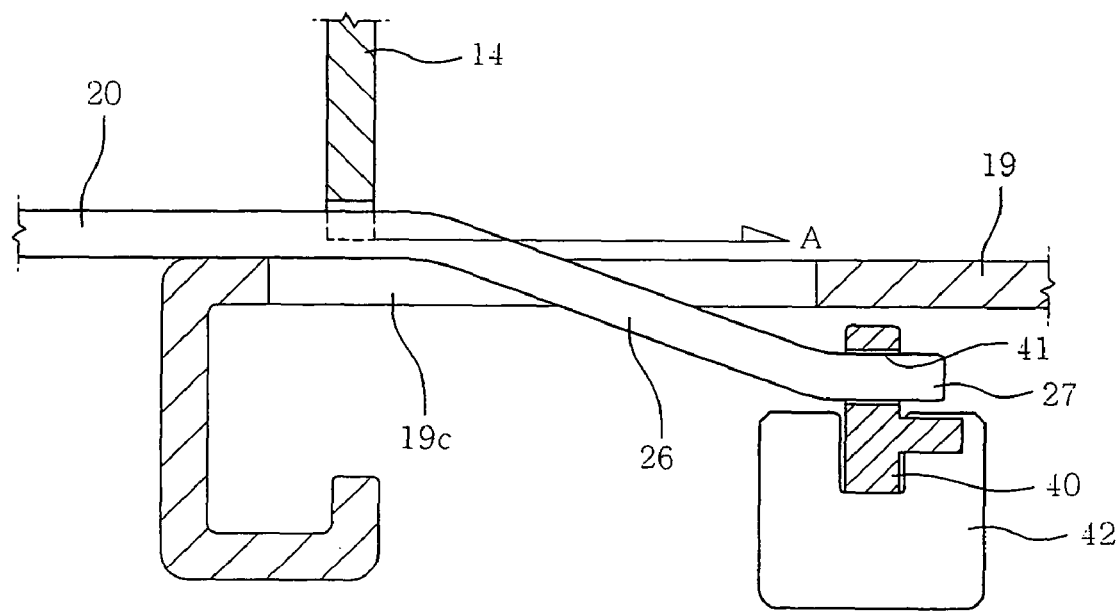
FIGS. 7 and 8 are enlarged views showing a structure for fixing the upper ends of screen bars according to the second embodiment of present invention.
Figure 8:
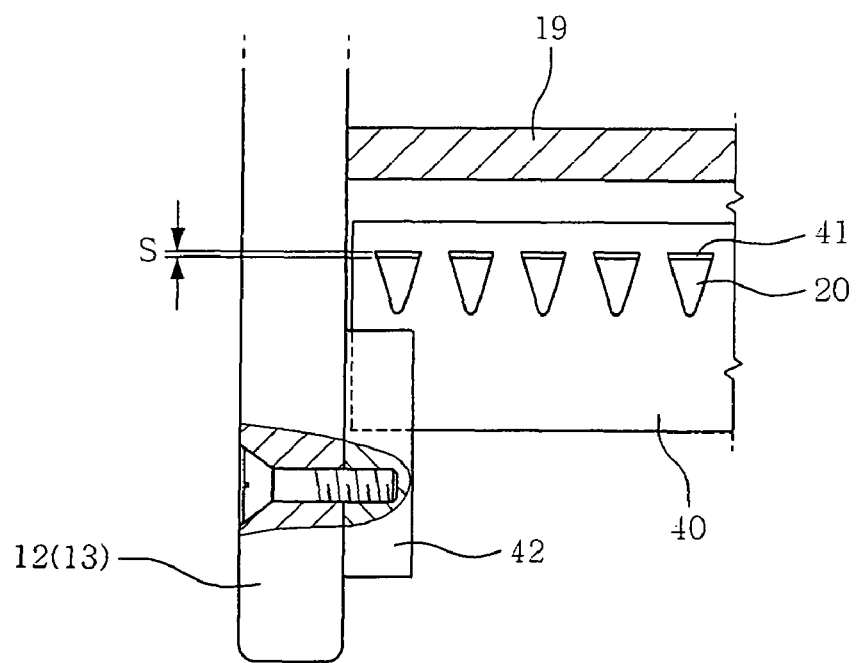

FIGS. 7 and 8 are partial enlarged views showing a structure for fixing the upper ends of the screen bars according to the second embodiment of present invention. In detail, FIGS. 7 and 8 illustrate that horizontal parts, which extends from inclined parts of the upper ends of the screen bars which pass through an impurity removal guide, are fitted into and fastened to respective fastening holes in an upper spacer.

As shown in FIGS. 1 and 2, the screening apparatus 10 according to the present invention is installed at an incline in the channel 1 for wastewater treatment. The rake 14 which rakes and removes the impurities contained in wastewater are caught by the screen bars 20 but do not pass through gaps 21 between the screen bars 20, the rakes 14 rakes the caught impurities to remove them is installed rotatably by the driving means 15.

To realize the above-mentioned construction, the screening apparatus 10 includes a frame with its two side-frames 12 and 13, which face each other to form the impurity removal space 11 therebetween. The rake 14 is installed rotatably in the impurity removal space 11 by the driving means 15.

Te driving means or drive system 15 for actuating the rake 14 includes a motor 16, which is installed in the screening apparatus 10, and a belt unit, which is transferred being wound on motor 16. Preferably, a chain 17 and a sprocket 18 are used as the belt unit.

The rakes of the present invention are installed in the chain 17 of the belt unit at positions spaced apart from each other at integrals ranging from 50 cm to 80 cm and move along the screen bars 20 as sprockets 18 rotate. Thereby, the rake 14 rakes and removes the impurities that are larger than the gap 21 and are thus caught by the screen bars 20 but do not pass through the gaps 21 while wastewater passes through the gaps 21 between the screen bars 20.

Round bar or a wedge bar, having an inverted triangular cross-section is used as each screen bar 20 for the present invention. The screen bars 20 are arranged parallel to each other to have gaps 21 ranging from 1 mm to 10 mm therebetween at the lower position in the impurity removal space 11 by the driving means 15. The screen bars 20 having this arrangement form the screen panel.

That is, the screen panel is formed by disposing the screen bars 20 at the rear position in the screening apparatus 10, which is installed in the channel 1 for wastewater treatment at an incline, and by arranging the screen bars 20 to have gaps 21 ranging from 1 mm to 10 mm therebetween such that the screen bars 20 are parallel to each other. The screen panel serves to filter out impurities, in particular, to filter out fine suspended solids, which are the majority of the impurities.

Here, a the lower ends of the screen bars 20 according to the present invention may be fixed in a lower coupling to the rear part of the lower end of the screening apparatus 10 by welding or using bolts, but, preferably, the screen bars 20 are fitted into and fastened to the respective fastening holes 31 of the lower spacer 30 such that the screen bars 20 are parallel to each other and are arranged to have gaps 21 ranging from 1 mm to 10 mm in a lateral direction therebetween.

For this, as shown in FIGS. 3 and 4, the lower spacer 30 is fastened to the lower ends of the side-frames 12 and 13 of the screening apparatus 10 using bolts. Furthermore, a notch 22 is formed in the lower end of each screen bar 20 by cutting part of the lower end of the screen bar 20 using a press.

The lower ends of the screen bars 20 can be firmly fastened to the lower end of the screening apparatus 10, because the notch 22 is fitted into fastening hole 31 formed on the lower spacer 30. In a more preferable embodiment of this structure, the upper end of the lower spacer 30 is covered with a clamp 32, which is fastened to the lower spacer 30 using bolts. In this case, the screen bars 20 can more firmly maintain the fixed state. Furthermore, even if some of the screen bars 20 are undesirably damaged, the damaged screen bars 20 can be easily and conveniently replaced with new ones.

Meanwhile, the upper ends o the screen bars 20, which are fixed in an upper coupling at the lower ends thereof, are bent towards the rear surface of the screening apparatus 10 and are fixed to the lower part of the upper end o the screening apparatus 10, such that the upper ends of the screen bars 20 are prevented from interfering with the linear travel track A of the rake 14.

This structure for fixing the upper ends of the screen bars 20 will be explained in detail herein below with reference to several embodiments.

In the first embodiment of the structure for fixing the upper ends of the screen bars 20, as shown in FIG. 5, part of the upper end of the screen bar 20 is bent towards the rear surface of the screen bar 20, thus forming a fastening part 23. The fastening part 23 is fastened to the rear part of the upper end of the screening apparatus 10 using a coupling means including a nut and a bolt.

Preferably, the fastening parts 23 of the screen bars 20 are fastened to the impurity guide 19 which is provided on the rear part of the upper end of the screening apparatus 10 and serves as an impurity exhaust chute exhausting the impurities which are moved by the rakes 14, using bolts.

More preferably, the fastening parts 23 of the screen bars 20 are inserted into the through hole 19a formed in the impurity guide 19 by laser machining and are in close contact with the impurity guide 19. Thereafter, the fastening parts 23 and the impurity guide 19 are fastened to each other using a clamp plate 24 and bolts.

Furthermore, preferably, when forming the through hole 19a in the impurity guide 19 through the laser machining, support pieces 19b are formed in the impurity guide 19 at positions corresponding to respective gaps 21 between screen bars 20 by laser machining and are bent in one direction such that the support pieces 19b protrude to support the screen bars 20, thus preventing the screen bars 20 from undesirably moving.

As such, after the upper ends of the screen bars 20 are fastened using the impurity guide 19, support bars 25, each of which is made of flat bar or pipe, are provided under the screen bars 20 at positions spaced apart from each other at intervals ranging from 30 cm to 50 cm and extend in the direction perpendicular to the screen bars 20, thus supporting the screen bars 20, thereby preventing the screen bars 20 from sagging.

Unlike the conventional technique, in which the upper and lower ends of the screen bars are welded to the support bars, in the present invention, the upper and lower ends of the screen bars 20 are fixed to the lower spacer 30 and the impurity guide 19 by the fitting coupling method and the bolt coupling method, respectively, such that the screen bars 20 are arranged parallel to each other to have gaps 21 ranging from 1 mm to 10 mm therebetween in the rear part of the screening apparatus 10. Therefore, the present invention solves the conventional problem in which impurities are entwined around or entangled in welding beads.

The above-mentioned structure for fixing the screen bars 20 is suitable for the case where the channel 1 is relatively shallow and the screening apparatus 10 is thus relatively short, or the case where the channel 1 is relatively deep and the transport water level of wastewater is also high to a degree corresponding to the depth of the channel 1, so that the length of the screen bars 20 is similar to that of the screening apparatus 10.

Meanwhile, the second embodiment of the structure for fixing the upper ends of screen bars 20 will be explained in detail herein below.

As shown in FIGS. 6 through 8, the upper ends of the screen bars 20 of this embodiment are fitted into respective fitting holes 41 in an upper spacer 40, which is provided below an impurity guide 19 and extends in the lateral direction of the screening apparatus 10.

The upper spacer 40 is supported at opposite ends thereof by upper spacer supports 42, which are fastened to the rear parts of the respective side-frames 12 and 13 using bolts, such that the upper ends of the screen bars 20 can be inserted into the respective fitting holes 41 in the upper spacer 40.

As such, because the upper spacer 40 is supported at the opposite ends thereof by the upper spacer supports 42, the movement of the screen bars 20 is allowed within required range of upward and downward movement, or forward and backward movement thereof.

Preferably, as shown in FIG. 8, each fitting hole 41, into which the upper end of the corresponding screen bar 20 is fitted, has a size, which is slightly larger than that of the cross-section of the screen bar 20, such that a clearance S of approximately 0.5 mm is defined between the fitting hole 41 and the screen bar 20. Thus, the screen bars 20 can be easily inserted into the respective fitting holes 41, and the screen bars 20 can maintain straightness without bending due to the difference in thermal expansion.

In the same manner, the structure having the clearance S is applied to each fastening hole 31, into which the lower end of the corresponding screen bar 20 is inserted. This is shown in FIG. 4.

More preferably, the structure for fixing the upper ends of the screen bars 20 is shown in FIG. 7. An inclined part 26 is formed by bending part of the upper end of each screen bar 20 towards the rear surface of the screen bar 20, and a horizontal part 27 is formed by bending the end of the inclined part 26 in the horizontal direction. And then the horizontal part 27 passes through a through hole 19c, which is formed in the impurity guide 19 by laser machining, and is inserted into the corresponding fitting hole 41 in the upper spacer 40, which is disposed below the impurity guide 19.

As such, because the structure for fixing the screen bars 20 is disposed below the impurity guide 19, which exhausts impurities that have been raked upwards by the rake 14, the fixing structure is prevented from interfering with the linear travel track A of the rake 14.

Furthermore, the upper spacer 40 for fixing the screen bars 20 is supported by the upper spacer supports 42 for fixing the upper spacer 40, and is mounted between the side-frames 12 and 13, such that a relatively small clearance of approximately 1 mm is defined between the width of the upper spacer 40 and the distance between the side-frames 12 and 13. Thus, the movement of the upper spacer 40 in the lateral direction is limited by the side-frames 12 and 13.

Here, as the upper spacer supports 42 support only the lower end of the upper spacer 40 such that the upper spacer 40 can be slightly movable upwards, the inclined part 26 of the upper end of the screen bar 20, which is bent downwards when the screen bar 20 is first manufactured, spreads slightly with the passage of time.

The structure for fixing the upper ends of the screen bars 20 according to this embodiment is suitable for the case where, although the channel 1 is relatively deep, the transport water level of wastewater is relatively low, so that it is unnecessary to manufacture the screen bars 20 to lengths corresponding to the depth of the channel 1.

As shown in the above-mentioned embodiments, the lower ends of the screen bars 20 are fixed to the rear part of the lower end of the screening apparatus 10. The medial portions of the screen bars 20 are supported on the rear surfaces thereof by the support bars 25, which are made of flat bar or pipe, and are thus maintained horizontal. The upper ends of the screen bars 20 are fixed to the rear part of the upper end of the screening apparatus 10. Therefore, the screen bars 20 can remain straight without being undesirably bent.

Furthermore, when the rakes 14, which are provided on the belt unit of the driving means 15 at positions spaced apart from each other at intervals ranging from 50 cm to 80 cm so as to rake the gaps 21 between the screen bars 20, travel along the screen bars 20, teeth of the rakes 14 are inserted into the respective gaps 21 between the screen bars 20 with clearances. Therefore, the straightness of the medial portions of the screen bars 20 and the gaps 21 can be maintained constant.

As described above, in a structure for fixing screen bars of a screening apparatus for wastewater treatment according to the present invention, the positions at which the upper ends of the screen bars are fixed to the screening apparatus are spaced apart from, and thus do not interfere with, the linear travel track of rakes, which move along the screen bars and rake gaps between the screen bars. In addition, the screen bars can be firmly fixed at correct positions by the fixing structure of the present invention. Therefore, the present invention can reduce the number of support bars to $1/5$ through $1/10$ of that of the conventional structure, in which the support bars are welded to the screen bars.

Furthermore, in the present invention, the support bars are constructed such that they merely support the screen bars, but are not welded to the screen bars. Hence, welding beads need not be formed, so that impurities such as hairs, which are relatively long, are prevented from being entwined around the screen bars, thus solving the problem in which the rakes flip due to the entwined impurities when moving along the screen bars, with the result that the rakes or a spring for cushion hinge mounted rakes may be damaged.

Moreover, the present invention can solve the problem in which gaps between the screen bars adjacent to the support bars are slowly clogged with impurities entwined around the support bars, and, ultimately, most of the gaps are clogged with impurities, thus inducing the overflow of wastewater.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A screening apparatus usable in a wastewater treatment plant to remove impurities contained in wastewater, comprising:
   a. a frame,
   b. a screen panel attached to said frame and formed of
      i. screen bars having upper and lower ends and front and rear surfaces and said screen bars being arranged parallel to each other to have gaps ranging from 1 to 10 mm therebetween, and
      ii. upper and lower spacer bars extending transversely at the opposite ends respectively of said screen bars and coupled thereto,
      said screen panel having front and rear surfaces defined by said corresponding front and rear surfaces of said screen bars,
   c. a plurality of rakes movable along said front surfaces of said screen bars to rake impurities caught by said screen panel,
   d. a drive system attached to said frame to move said rakes, and
   e. an impurity guide attached to said frame adjacent upper end of said screen panel to receive said impurities raked off said screen panel, wherein, the lower end of each of said screen bars includes a notch being connectible with clearance to one of a plurality of fastening holes formed on said lower spacer bar, and wherein said upper end of each of the screen bars comprises a fastening part formed by bending a part of the upper end of the screen bar toward the rear surface of the screen bar which is inserted into a through hole formed in said impurity guide, such that the upper ends of the screen bars are prevented from interfering with the linear travel track of the rakes, and wherein said screen bars have medial portions between their opposite ends, said apparatus further comprising support bars positioned closely adjacent the rear surfaces of said screen bars at the medial portions thereof and oriented in a direction perpendicular to the screen bars to prevent the medial portions from sagging.

2. The structure for fixing the screen bars of the screening apparatus for wastewater treatment as set forth in claim 1, wherein the lower ends or the upper ends of the screen bars are fitted into respective fastening holes with clearances, so that the screen bars remain straight without bending due to a difference in thermal expansion between the screen bars and side-frames of the screening apparatus.

3. Apparatus for screening impurities from a flow of wastewater in a wastewater treatment plant, said apparatus comprising:
  a. a frame having opposite sides and opposite lower and upper ends,
  b. a screen panel attached to said frame and comprising a plurality of elongated screen bars situated generally parallel to each other and spaced apart from each other defining a gap between adjacent screen bars in the range of 1-10 mm, said screen bars having front surfaces which the define the front surface of said screen panel that receives said wastewater flow,
  c. a plurality of rakes, each extending transversely across the front surface of said screen panel, said rakes being generally parallel to each other and spaced apart from each other, and
  d. a drive system coupled to and driving said rakes in successive paths lengthwise along said front surface of said screen panel, where each of said rakes extends into and along one of said gaps between two adjacent screening bars,
  each of said screen bars having a lower end coupled in a lower coupling to said lower spacer bar and an opposite upper end coupled in an upper coupling to said upper spacer bar,
  said lower couplings releasably holding with clearance said lower ends of said screening bars, and
  said upper ends of said screen bars being bent away from the plane of the screen panel and thus prevented from interfering with the linear travel path of said rakes, and
  said apparatus further comprising a plurality of support bars extending transversely across said screening panel below and supporting said screening bars, wherein each of said lower couplings comprises a notch in the lower side of the lower end of each screen bar and one of a plurality of openings in said lower spacer.

4. The apparatus according to claim 3 wherein said lower couplings comprise openings in said lower spacer bar formed by spaced apart notches and a board overlying each of said notches and secured thereto.

5. The apparatus according to claim 3 wherein said rakes are attached to a belt formed as an endless loop, said belt being driven in a loop path by said drive system.

6. A structure for fixing screen bars of a screening apparatus for wastewater treatment, the screen bars having upper and lower ends and medial portions, the screening apparatus being installed in a wastewater treatment plant to remove impurities contained in wastewater, the screening apparatus comprising:
  a screen panel formed by arranging the screen bars parallel to each other to have gaps ranging from 1 mm to 10 mm therebetween,
  rakes movable along a front surface of the screen bars, and
  drive means to move said rakes to rake the impurities caught by the screen panel,
  wherein a notch is formed in the lower ends of the screen bars, the notch is fastened to a fastening hole formed on the lower spacer formed in a rear part of a lower end of the screening apparatus,
  the upper end of each of the screen bars comprises
    an inclined part formed by bending a part of the upper end of the screen bar towards the rear surface of the screen bar, and
    a horizontal part formed by bending an end of the inclined part in a horizontal direction,
  wherein the horizontal parts of the screen bars are inserted into through holes, which are formed in an impurity guide, and are fitted into respective fitting holes in an upper spacer which is disposed below the impurity guide such that the upper ends of the screen bars are prevented from interfering with the linear travel track of the rakes,
  and said medial portions of the screen bars are supported by support bars, oriented in a direction perpendicular to the screen bars, to prevent the medial portions of the screen bars from sagging.

7. The structure according to claim 6, wherein the lower ends or the upper ends of the screen bars are fitted into respective fitting holes with clearances, so that the screen bars remain straight without bending due to a difference in thermal expansion between the screen bars and side-frames of the screening apparatus.

* * * * *